Patented Dec. 25, 1923.

1,478,985

UNITED STATES PATENT OFFICE.

JACQUE CYRUS MORRELL, OF NEW YORK, N. Y.

ARTIFICIAL OR SYNTHETIC CHARCOAL AND PROCESS OF PRODUCING THE SAME.

No Drawing.   Application filed March 22, 1919.   Serial No. 284,459.

*To all whom it may concern:*

Be it known that I, JACQUE C. MORRELL, a citizen of the United States, and residing at New York city, have invented certain new and useful Improvements in Artificial or Synthetic Charcoal and Processes of Producing the Same, of which the following is a specification.

This invention relates to artificial or synthetic charcoals generally used for the adsorption and removal of impurities from air for respiration, as a gas adsorbent for any purpose, and in various industrial and laboratory processes as a decolorizing and purifying agent used for the removal of color and impurities from sugar solutions, glycerine, cotton seed and other oils, and all types of organic compounds: and wherever adsorptive, decolorizing or purifying material can be used. This invention contemplates the production of such active charcoal from carbonaceous material such as ground coke, coal, wood charcoal, carbonblack, and others. This invention may be applied to the manufacture of materials other than charcoals, for instance, to the manufacture of carbon electrodes, graphite crucibles, and other molded or extruded articles of like nature, and even molded articles of non-carbonaceous or earthy materials such as silica dishes, clay receptacles, porous filters cups, etc.

The best types of adsorbent charcoals are those which are most free from hydrocarbon impurities, possess a large degree of porosity and have supporting walls which are most dense. The pores or ducts should be of the continuous or spongy type and the charcoal should possess as many of these ducts as is compatible with the necessary strength of the supporting structure. It is among the objects of this invention to produce such a charcoal which shall contain the maximum number or pores and consequently will show a very high activity.

Activation of charcoal or carbon is the increasing of the adsorption efficiency of the material. This may be accomplished among other methods by;

(*a*) Repeated heat treatments.

(*b*) Steam treatment.

(*c*) Heating in presence of mild oxidizing agents.

The process of activation is probably;

(*a*) An opening up of the closed pores into ducts (continuous pores) by fracturing the walls.

(*b*) Removal of tenacious hydrocarbons and compounds other than carbon by decomposition, cracking and volatilization.

(*c*) Changing hard graphitoidal or "coke like" carbon to the soft, dull, velvety or nongraphitoidal variety.

(*d*) Removal of secondary carbon obstructions from the ducts.

(*e*) Forming or creating new ducts in the carbon and thus increasing adsorption surface.

The prior work of this character, in conjunction with the present invention was based on a process whereby carbon black or other suitable material was mixed with a binder and subjected to high pressure at elevated temperatures. The usual procedure was to grind the binder, as resins of a semi-solid or non-fluid nature of pitch in a ball mill, thoroughly with the carbon black and subject the mixture to various pressures at temperatures ranging from just beyond the melting point of the binder to a decomposing temperature. Difficulty is encountered in intimately incorporating the binding material with the carbon black because of the viscosity of the former and since uniformity of distribution of the binder has a marked effect on the porosity and uniformity of the synthetic adsorbent charcoal, the incorporation of the binder and carbonaceous material requires extreme subdivision of both and long continued mixing under heat.

In carrying the objects of this invention into effect, I provide a process whereby some form of carbon preferably carbon black is molded after first mixing with a binding material. I preferably cleanse the finely divided carbonaceous material by a suitable process such as that described in my copending application Serial No. 284,460, filed on concurrent date herewith, patented November 16, 1920, Patent No. 1,359,091, mix the same with the binder which is preferably a suspension of hard pitch mixed with an emulsion of heavy hydrocarbon oil in an ammonium tannate-tannic acid solution (or other protecting colloid or colloids such as tannins, soaps, etc.) this mixture resulting in an emulsion of soft pitch as is described and claimed in my copending application, Serial No. 284,461, filed on concurrent date herewith. The material is then dried and molded and the binder is decomposed, generally after grinding to proper size. The synthetic charcoal so formed may be then cleansed and activated by a special heat treatment.

The viscosity of an emulsion is very much less, when the proper amount of dispersion medium is used, than that of the emulsified material. The problem of distributing such a viscous material as soft pitch throughout a mass of finely divided carbon is extremely difficult, even with the application of heat and the use of mechanical means, since the carbonaceous material tends to ball up instead of the individual grains being wetted by the pitchy binder.

When carbonaceous particles, such as carbon black, etc., are placed in an emulsion of soft pitch, or other emulsified binder, the globules of soft pitch, or other emulsified binder, are attracted to the carbon particles and adhere upon their surfaces, the latter phenomena being known as adsorption. If the water is now filtered off, there remains upon the particles of carbonaceous material, a film of the binding material, e. g., soft pitch, etc. The mechanically held water is then driven off by gentle heating, the remaining product being a homogenous mixture of the binding material and carbonaceous material, such that upon compression and subsequent heat treatment the decomposition of the binding material leaves a residue of porous carbon along the positions previously occupied by the former. The product is therefore characterized by a sponge or lung like structure, the distribution of the ducts necessarily being homogenous.

As a specific example of my process, I describe the preparation of a synthetic charcoal from carbon black. The carbon black is first cleansed of its volatile oily impurities by a steam treatment at a temperature of 450° C. to 600° C. for several hours. As a binding agent I prefer using an emulsion of soft pitch, made from a mixture of a suspension of hard pitch in water containing a protective colloid such as ammonium tannate-tannic acid and an emulsion of anthracene oil, emulsified in a solution containing a small percentage of ammonium tannate-tannic acid mixture (or other protecting colloid). The addition of the carbon black to the emulsion presents some difficulty caused by the fact that the carbon black is extremely light and adsorbed air still further tends to buoy up the material. The usual method of mixing is to add the carbon black in a steady stream to the emulsion meanwhile agitating vigorously. The mixture is then filtered to remove most of the water and dried at a temperature of from 85° C. to 140° C. I have found that in making an emulsion of pitch and oil for use in the manufacture of charcoal, suitable working proportions are from 1-3 parts (by weight) of oil to 3-1 parts (by weight) of pitch. The dispersing medium should be from 2-10 times (by weight) the amount of the material dispersed. The quantity of carbon may vary from 1-4 times the total actual binding material.

The mixture freed from water is placed in a mold consisting of a sleeve, plunger and plug which is heated to about 90° C. and compressed with a pressure of from 16 to 30 tons per square inch; any substantial pressure will suffice. However, the quality of the product improves with increase in pressure up to a certain point. The function of molding under pressure is a very important one, determining to a large extent the nature and quality of the finished product. The best types of charcoal have been previously described among other things as those which "possess a large degree of porosity and have supporting walls which are most dense." These are the qualities which molding under pressure gives the finished product. Also, as has been previously described, the "pores and ducts should be of the continuous or spongy type." When the mixture of binder and carbon is heated without first molding under pressure a large proportion of the ducts are discontinuous and the product is friable because the walls are not sufficiently dense. In large scale work a rotary press, whose molds pass through a heated zone could be used.

The temperature to which it is necessary to heat is dependent upon the melting point of the pitch which in turn is dependent upon the percentage of oil in the mixture and the conditions can be controlled to allow compression in the cold and the pressure may be varied within wide limits depending on the final product desired.

The crude charcoal from the press is crushed and ground to from 8 to 10 mesh or any desired size. The grindings are utilized for regrinding to a powder after which they are recompressed without any other additions to produce charcoal. The ground material is introduced into a furnace and gradually brought to the decomposing temperature at which the binder chars. For activation, schedules of 4 hours at 850° C., then to 925° C. for one-half hour, and of 3 hours at 925° C. to 950° C. have proven satisfactory.

I have found that a final heat treatment following the above steps causes a marked improvement in the efficiency of the charcoal. This is true not only of synthetic charcoals but also of other charcoals as for instance, standard cocoanut charcoal which showed an improvement of 50% in activity after this treatment. The apparent density of the charcoal after this treatment shows a pronounced lowering which, it is thought, is caused by the internal oxidation by adsorbed air or the removal of hydrocarbons or both, by this heat treatment. Heating beyond a certain length of time in the first carbonization treatment causes little improvement in the charcoal. However, if the charcoal is allowed to cool to about 250° C. removed from the furnace and cooled in the air to room temperature to prevent the adsorption of hydrocarbons by the charcoal upon a second heat treatment, the above described results take place. Since the walls of the furnace contain condensed hydrocarbons, the second heating it done in a different furnace (though if cleansed one furnace will suffice). The conditions under which this heat treating process is carried on should be at about 850° C. to 950° C. for about 2 hours. A third heat treatment also shows beneficial results. Heating in the presence of steam and other mild oxidizing agents also produces beneficial results. This may be done by any well known method, for example, by introducing steam directly into the retort.

Although I have described a specific embodiment of my invention as applied to the manufacture of artificial or synthetic charcoals, I do not intend to limit myself to the exact details given but changes in the various features described may be made without departing from the spirit of my invention.

I claim:

1. Built-up, structural charcoal comprising the charred and activated product of a mixture of finely divided carbon and a uniformly distributed binder compressed under tons of pressure, said charcoal having highly active, adsorbent powers.

2. Built-up structural charcoal comprising the charred and activated product of comminuted particles of a compressed mixture of finely divided carbon and a uniformly distributed binder, said charcoal having a sponge-like structure formed of carbon of a microscopic state of sub-division and held together by thin, uniformly distributed films of charred material resulting from the decomposition of said binder and said charcoal having highly active, adsorbent powers.

3. Built-up, structural charcoal comprising the charred and activated product of comminuted particles of a compressed mixture of finely divided carbon and a uniformly distributed binder, said charcoal having a sponge-like structure formed of carbon of a microscopic state of sub-division and held together by thin, uniformly distributed films of charred material resulting from the decomposition of said binder, substantially all of the pores and ducts of said charcoal being continuous and of microscopic cross-section and said charcoal having highly active, adsorbent powers.

4. Built-up, structural charcoal comprising a charred and activated product of a mixture of finely divided carbon and a uniformly distributed binder compressed under tons of pressure, said charcoal being dense and firm and having highly active, adsorbent powers and homogeneous and uniform porosity.

5. Built-up, structural charcoal comprising the charred and activated product of comminuted particles of a compressed mixture of finely divided carbon and a uniformly distributed binder, said charcoal being dense and firm and having a sponge-like structure formed of carbon of a microscopic state of sub-division and held together by thin, uniformly distributed films of charred material resulting from the decomposition of said binder, substantially all of the pores and ducts of said charcoal being continuous and of microscopic cross-section and said charcoal having highly active, adsorbent powers.

6. In a process of making built-up, structural adsorbent charcoal, thoroughly mixing carbon with a binder which chars on heating, molding the residue under substantial pressure, comminuting the molded material and charring the binding material therein and then activating by heating.

7. In a process of making built-up, structural adsorbent charcoal, thoroughly mixing carbon with a binder which chars on heating, molding the residue under substantial pressure, comminuting the molded material and charring the binding material therein and then activating by heating and steaming.

8. In a process of making built-up, structural adsorbent charcoal, thoroughly mixing carbon with a binder which chars on heating, compressing the residue under tons of pressure, charring the binding material therein and then activating by heating.

9. In a process of making built-up, structural adsorbent charcoal, thoroughly mixing carbon with a binder which chars on heating, molding the residue under tons of pressure, comminuting the molded material and charring the binding material therein and then activating by heating.

10. In a process of making built-up, structural adsorbent charcoal, thoroughly mixing carbon with a binder which chars on heating, compressing the residue under tons of pressure charring the binding material therein and then activating by heating and steaming.

11. In a process of making built-up structural adsorbent charcoal, thoroughly mixing carbon with a binder which chars on heating, molding the residue under tons of pressure, comminuting the molded material and charring the binding material therein and then activating by heating and steaming.

12. In a process of making built-up structural adsorbent charcoal, mixing carbon with an emulsion of a binder which chars on heating, filtering, molding the residue under substantial pressure, charring the binding material therein and then activating by heating.

13. In a process of making built-up structural adsorbent charcoal, mixing carbon with an emulsion of a binder which chars on heating, filtering, drying at a moderate temperature and then molding the residue, charring the binding material therein and then activating by heating.

14. In a process of making built-up structural adsorbent charcoal, mixing carbon with an aqueous emulsion of a binder which chars on heating, filtering, drying and then molding the residue, comminuting the molded material and charring the binding material therein and then activating by heating.

15. In a process of making built-up structural adsorbent charcoal, mixing carbon with an emulsion of a binder which chars on heating, filtering, drying and then molding the residue under substantial pressure, comminuting the molded material and charring the binding material therein and then activating by heating and steaming.

16. In a process of making built-up structural adsorbent charcoal, mixing carbon with an aqueous emulsion of tar-pitch and oil, filtering, drying and then molding the residue under substantial pressure, comminuting the molded material and charring the binding material therein and then activating by heating.

17. In a process of making built-up structural adsorbent charcoal, adding a suspension of coal tar pitch to an emulsion of oil and then mixing carbon therewith, filtering, drying and then molding the residue, comminuting the molded material and charring the binding material therein and then activating by heating.

18. In a process of making built-up structural adsorbent charcoal, adding a suspension of coal tar pitch to an emulsion of oil and then mixing carbon therewith, filtering, drying and then molding the residue, comminuting the molded material and charring the binding material therein and then activating by heating and steaming.

19. In a process of making built-up structural adsorbent charcoal, mixing carbon with an aqueous emulsion of tar pitch and oil, filtering, drying and then molding the residue under substantial pressure, comminuting the molded material and charring the binding material therein and activating by heating at 850°–950° C., cooling to about 250° C., and then reheating to 850°–950° C.

20. In a process of making built-up structural adsorbent charcoal, mixing carbon with an emulsion of a binder which chars on heating, filtering, molding the residue, comminuting the molded material and charring the binding material therein and then activating by heating and treatment with a mild oxidizing agent.

21. In the process of making built-up structural adsorbent charcoal, mixing carbon with an emulsion of a binder which chars on heating, molding the mixture, comminuting the molded material and charring the binding material therein and then activating by heating and steaming.

22. In a process of making built-up structural adsorbent charcoal, mixing carbon with an emulsion of a binder which chars on heating, molding the mixture, comminuting the molded material and charring the binding material therein and then activating by heating at high temperatures, cooling and then reheating.

23. In a process of making built-up structural adsorbent charcoal, cleansing finely divided carbon by steam treatment, mixing same with an emulsion of a binder which chars on heating, filtering, drying and then molding the residue under substantial pressure, comminuting the molded material and charring the binding material therein and then activating by heating.

JAC CYRUS MORRELL.

Certificate of Correction.

It is hereby certified that in Letters Patent No. 1,478,985, granted December 25, 1923, upon the application of Jacque Cyrus Morrell, of New York, N. Y., for an improvement in "Artificial or Synthetic Charcoal and Processes of Producing the Same," errors appear in the printed specification requiring correction as follows: Page 1, line 44, for the word " or " read *of*, and line 76, for the word " of ", second occurrence, read *or;* page 3, line 17, for the word " it " read *is*, and after line 28, insert the following paragraph:

*By the term carbon as used in the claims, I propose to include pure carbon of natural or artificial origin or a mixture of natural or artificial origin which contains a high percentage of carbon; also various charcoals of animal, vegetable or mineral origin.;* same page, line 124, claim 10, after the word " pressure " insert a comma; and that the said Letters Patent should be read with these corrections therein that the same may conform to the record of the case in the Patent Office.

Signed and sealed this 12th day of February, A. D., 1924.

[SEAL.]

KARL FENNING,
*Acting Commissioner of Patents.*